United States Patent [19]

Watanabe

[11] Patent Number: 4,935,684
[45] Date of Patent: Jun. 19, 1990

[54] CONTROL SYSTEM FOR INDUCTION MOTOR

[75] Inventor: Eiki Watanabe, Inazawa, Japan

[73] Assignee: Mitsubishi Denki Kabushiki Kaisha, Japan

[21] Appl. No.: 383,251

[22] Filed: Jul. 21, 1989

Related U.S. Application Data

[63] Continuation of Ser. No. 195,299, May 18, 1988, abandoned.

[30] Foreign Application Priority Data

May 20, 1987 [JP] Japan .................................. 62-121159

[51] Int. Cl.$^5$ ............................................. H02P 5/40
[52] U.S. Cl. .................................... 318/729; 318/798; 318/811
[58] Field of Search ............... 318/803, 811, 798, 806, 318/729

[56] References Cited

U.S. PATENT DOCUMENTS

| | | | |
|---|---|---|---|
| 3,748,556 | 7/1973 | Gillett | 318/729 |
| 4,328,454 | 5/1982 | Okuyama et al. | 318/803 |
| 4,420,719 | 12/1983 | D'Atre et al. | 318/803 |
| 4,602,199 | 7/1986 | Walker | 318/798 |
| 4,652,989 | 3/1987 | Kurosawa | 318/808 |

FOREIGN PATENT DOCUMENTS 2085204  4/1982  United Kingdom ................ 323/205

OTHER PUBLICATIONS

International Power Electronics Conference, Conference Record, Mar. 27–31, 1983, pp. 720–731; "High Performance AC Motor Speed Control System Using GTO Converters", Toshiaki Okuyama et al.

Primary Examiner—David Smith, Jr.
Attorney, Agent, or Firm—Leydig, Voit & Mayer

[57] ABSTRACT

This invention relates to a control system for an induction motor which has power factor control means for altering the power factor of the input current of a converter composed of self-arc extinguishing elements, such as transistors, to vary the d.c. output voltage of the converter to perform a pulse-amplitude modulation control in a variable voltage, variable frequency controller for controlling the rotating speed of the induction motor by the converter of a sinusoidal wave input to reduce noise generated by the operation of the motor.

2 Claims, 6 Drawing Sheets

CONTROL SYSTEM FOR INDUCTION MOTOR

This application is a continuation of application Ser. No. 195,299, filed May 18, 1988, now abandoned.

BACKGROUND OF THE INVENTION

This invention relates to a control system for an induction motor driven by an inverter type for use, for example, in an elevator and, more particularly, to a reduction in the noise of an induction motor to control the speed of the motor.

Recently, the rotating speed of an induction motor can be controlled in the same degree as a d.c. motor due to the improvement in the control technique as an electronic technique has been developed. There is a variable voltage variable frequency controller (hereinbelow termed a VVVF controller) to control the speed of an induction motor. The VVVF controller converts an a.c. voltage into a d.c. voltage and again converts the converted d.c. voltage to an a.c. voltage by an inverter to vary the frequency of the voltage and to vary an output voltage inversely proportional to the frequency, thereby controlling the rotating speed of the induction motor.

Such a VVVF controller employs a pulse-amplitude modulation (hereinbelow termed PAM) control for variably controlling a d.c. voltage of the peak value of the output voltage of an inverter and pulse-width modulation (hereinbelow termed PWM) control for controlling a mean voltage by varying the time width by fixing the peak value.

When it is necessary to control the speed of an induction motor over a wide range from a stopping state to its full speed, for example, in an elevator, both the PAM control and the PWM control are employed because the noise of the induction motor increases if a full voltage is outputted from a converter to the motor at a lower speed.

Figure 1:
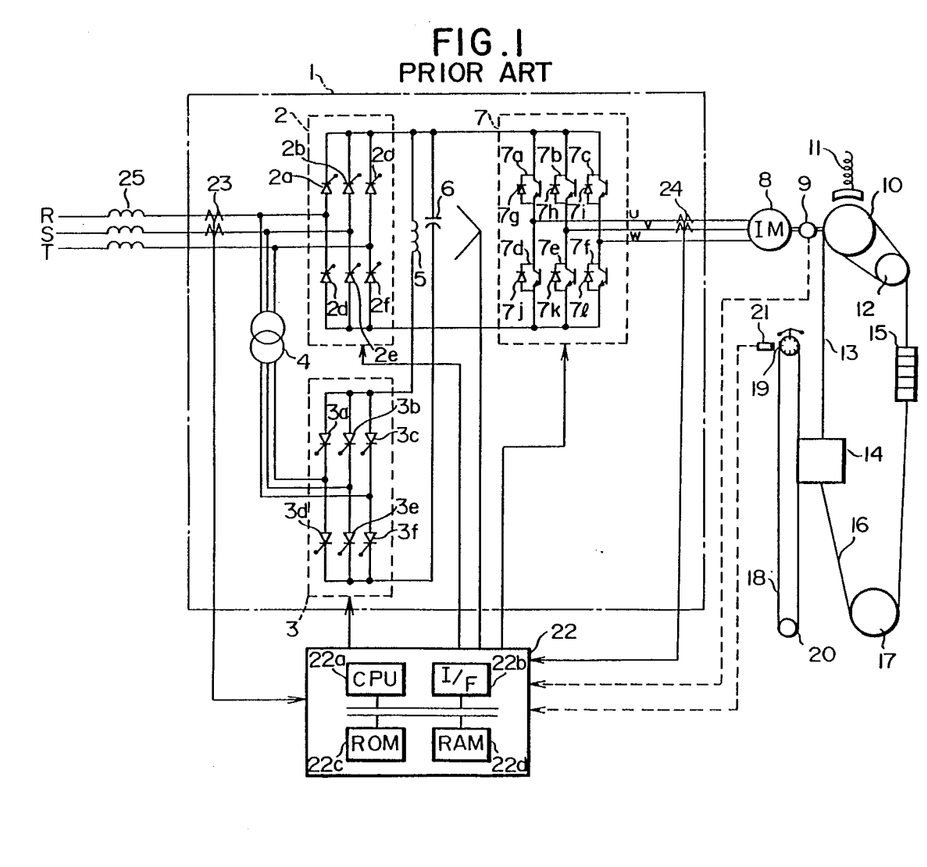
FIG. 1 is a view of a construction of a control system for an induction motor in a conventional elevator.

FIG. 1 shows the constitution of a control system for an induction motor in a conventional elevator. Reference numeral 1 denotes a VVVF controller connected to a 3-phase a.c. power source. Numeral 2 denotes a converter having thyristors 2a to 2f connected in a bridge for converting an a.c. voltage supplied to the VVVF controller 1 to a d.c. voltage, numeral 3 denotes a regenerative converter having thyristors 3a to 3f connected in a bridge for converting a d.c. voltage from converter 2 to an a.c. voltage, numeral 4 denotes an autotransformer for transforming an a.c. voltage from the regenerative converter 3 for supplying it to the input terminal of the converter 2, numeral 5 denotes a reactor connected between the input terminals of the regenerative converter 3, numeral 6 denotes a smoothing condenser connected between the d.c. output terminals of the converters 2 and 3, and numeral 7 denotes a transistor inverter having transistors 7a to 7f and diodes 7g to 7l connected in a bridge for converting a d.c. voltage outputted from the converter 2 to a variable voltage variable frequency a.c. voltage. Numeral 8 denotes an induction motor driven by the output voltage of the transistor inverter 7 for an elevator, numeral 9 denotes a tachometer generator for detecting the rotating speed of the induction motor 8, numeral 10 denotes a sheave driven by the rotation of the induction motor 8, numeral 11 denotes a mechanical brake, numeral 12 denoes a deflection wheel, numeral 13 denotes a hoisting rope engaged between the sheave 10 and the deflection wheel 12, numeral 14 denotes an elevator cage attached to one end of the hoisting rop 13, numeral 15 denotes a balance weight attached to the other end of the hoisting rope 13, numeral 16 denotes a compensating rope connected through a balance wheel 17 to between the cage 14 and the balance weight 15, and numeral 18 denotes a governor rope engaged between a governor 19 and a tension wheel 20, and part of the governor rope 18 is fixed to the cage 14.

Numeral 21 denotes a pulse detector for detecting the rotation of the governor 19, and numeral 22 denotes control means for controlling the converter 2, the regenerative converter 3, and the transistor inverter 7 upon reception of signals from the tachometer generator 9 and the pulse detector 21. The control computer 22 has a CPU 22a, an interface 22b, a ROM 22c and a RAM 22d. Numerals 23 and 24 denote current transformers provided at the input and output sides of the VVVF controller, and numeral 25 denotes an a.c. reactor connected to the a.c. power source.

In the control system for the induction motor of the elevator constructed as described above, the 3-phase a.c. voltages supplied from the 3-phase a.c. power source are converted by the converter 2 to a d.c. voltage, which is, in turn, smoothed by the condenser 6, supplied to the transistor inverter 7, which again converts it to an arbitrary voltage and frequency a.c. voltage. The transistor inverter 7 is PWM-controlled by the control computer 22.

Figure 2A:
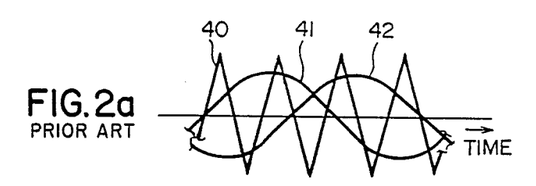
FIGS. 2(a), 2(b) and 2(c) are waveform diagrams showing the PWM control of a transistor inverter in FIG. 1.
Figure 2B:
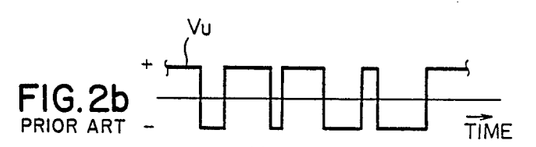
Figure 2C:
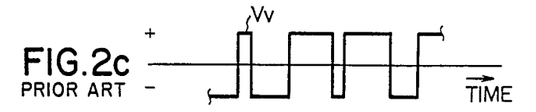
Figure 2D:
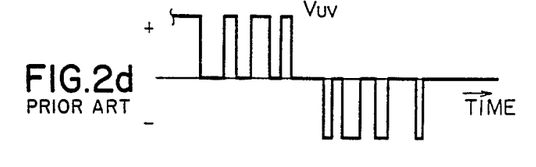

The PWM-control, as shown in FIG. 2(a), compares the triangular modulation voltage 40 with control voltages 41 and 42 from the phases, such as phases R and S of the 3-phase a.c. power source inputted to the control computer 22 to gate the transistors 7a to 7f of the transistor inverter 7, thereby producing an approximately sinusoidal wave. FIG. 2(b) shows an example of the voltage $V_U$ of the phase U outputted from the transistor inverter 7, and FIG. 2(c) shows an example of the voltage $V_V$ of the phase V, and FIG. 2(d) shows the voltage $V_{UV}$ between the lines of the phases U and V.

The frequency of the modulated voltage 40 used for the PWM control ordinarily employs a frequency of approximately 1 KHz (hereinbelow termed "carrier frequency"). The induction motor 8 generates noise due to this carrier frequency.

In an elevator, if a living room is disposed adjacent to a machine room, noise reduction is required. Thus, a large a.c. reactor is inserted on the input side of the induction motor 8 to attenuate the high frequency, or a special low noise motor is used as the induction motor 8. However, both have demerits of large size and expensive cost. There is generally a method of increasing the carrier frequency to approximately 10 KHz which is scarcely heard by ears, but the switching of the transistor inverter 7 results in an increase in the switching loss. Thus, the transistor capacity of the transistor inverter 7 must be increased to as to eliminate a thermal problem caused thereby, thus increasing the cost.

In the VVVF controller in FIG. 1, the phase angle of the power source voltage is controlled by PAM control of the converter 2 or the regenerative converter 3 when a large current flows to the induction motor at the time of accelerating the elevator for lowering the d.c. voltage as compared with that at a rated speed, thereby reducing the noise of the induction motor 8.

However, when the phase angle is controlled by the thyristors of the converter 2 or the regenerative converter 3, a number of harmonic waves of fifth and seventh orders are generated as heretofore known. Since the inverter or CVCF for an equipment, such as an air conditioner, which generate such harmonic waves have increased recently in building, there is a trend of restricting the harmonic waves generated by various equipment.

SUMMARY OF THE INVENTION

This invention has as its main objects to overcome the disadvantages described above, and provides a control system for an induction motor in an elevator in which current flowing to a VVVF controller is a sinusoidal current including no harmonic waves and which the output side d.c. voltage of a converter can be lowered.

A control system for an induction motor in accordance with the invention comprises a variable voltage variable frequency (VVVF) controller connected to receive alternating current (AC) input voltage in current and having a converter and an invertor composed of self-arc extinguishing elements connected to supply a VVVF AC voltage to the induction motor, thereby controlling the speed of the induction motor. The control system also comprises a control means for controlling elements of the converter by using pulse-width modulation (PWM) of gating signals, and dead time generating means for introducing a phase shift to produce a phase difference between output current and the input voltage to the converter by varying the width of the PWM gating signals to produce a non-unity power factor. Current is controlled to vary motor speed over a wide range without requiring full voltage output from the invertor, thereby minimizing motor noise.

BRIEF DESCRIPTION OF THE DRAWINGS

In the drawings, the same symbols indicate the same or corresponding parts.

DESCRIPTION OF THE PREFERRED EMBODIMENTS

Before the present invention is explained, a control system shown in FIGS. 3 and 4 will be described wherein a rectified sinusoidal current is formed at the output of the converter, thus avoiding the problem arising when harmonics are generated.

Figure 3:
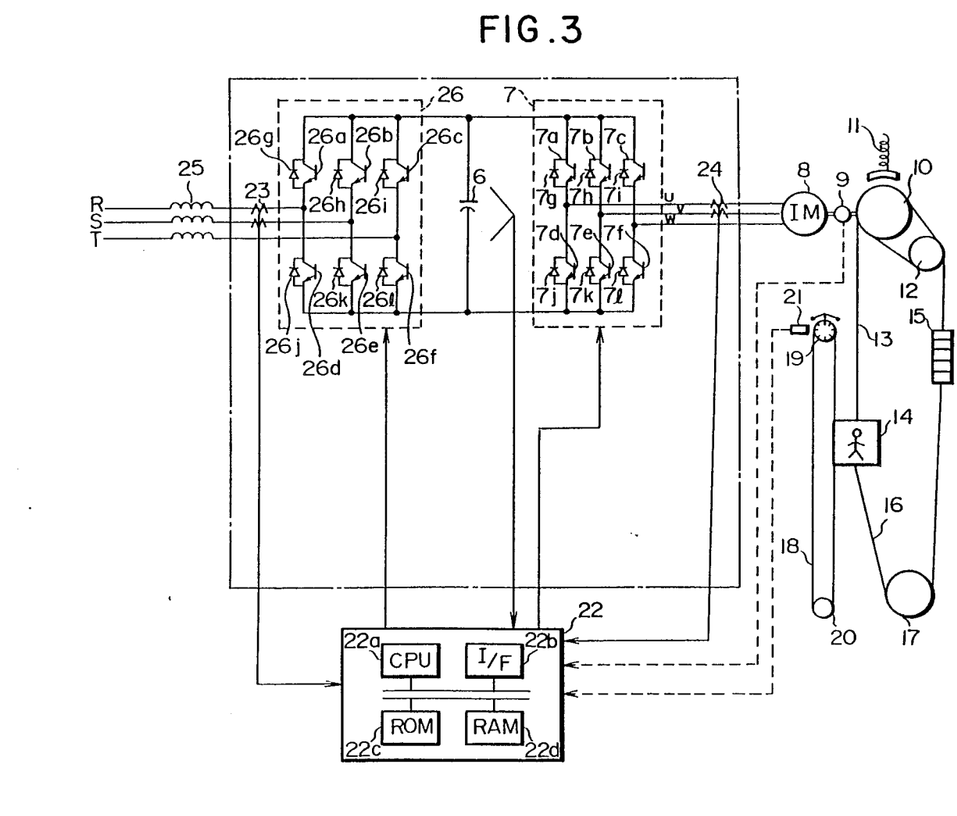
FIG. 3 is a view of a construction of a control system for an induction motor improved from the control system in FIG. 1.

In FIG. 3, the same reference numerals as those in FIG. 1 denote the same or corresponding parts in FIG. 1. Reference numeral 26 denotes a converter composed of transistors 26a to 26f and diodes 26g to 26l connected in parallel with respective transistors in inverter 7. The converter 26 is controlled by a control computer 22.

Figure 4:
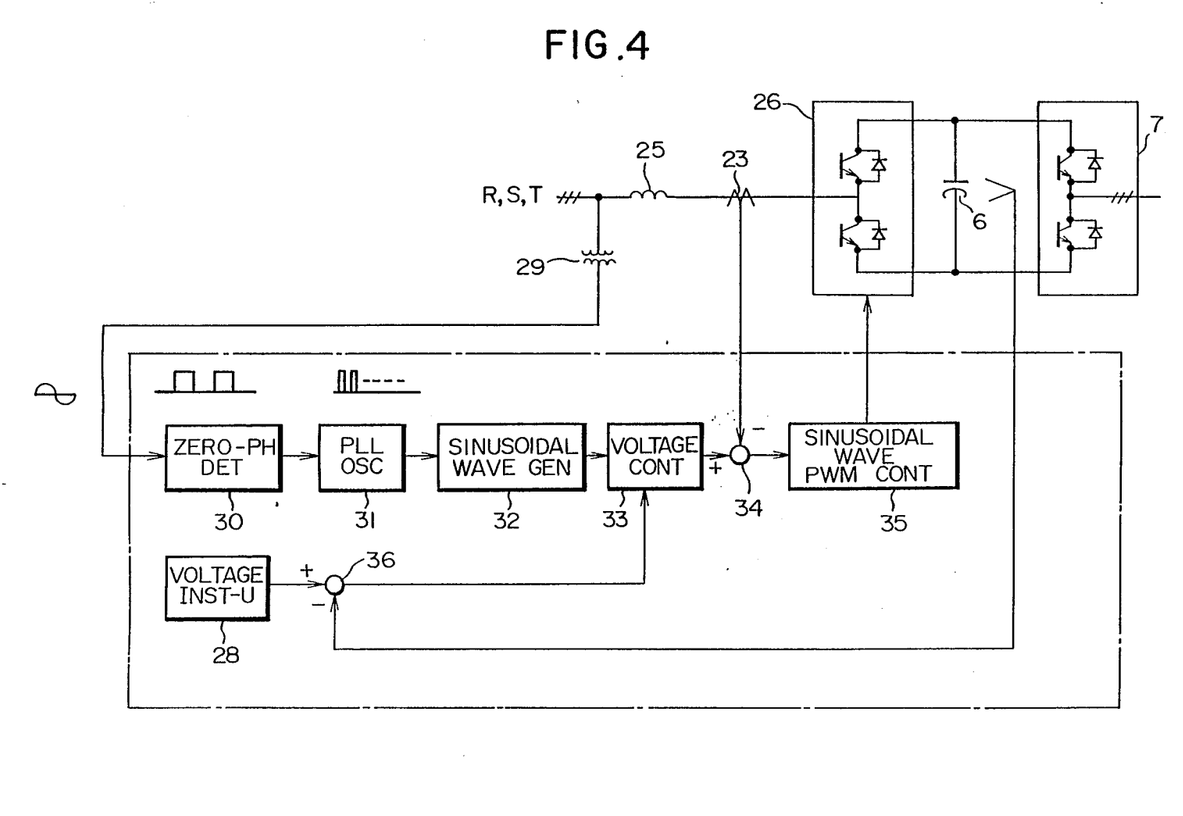
FIG. 4 is a block diagram of the control system of FIG. 3.

FIG. 4 shows the control block diagram of a control computer 22 for controlling the converter 26. In the drawing, numeral 28 denotes a voltage instruction unit for controlling a d.c. voltage outputted from the converter 26, numeral 29 denotes a transformer for producing a voltage signal synchronized with a power source voltage, numeral 30 denotes a zero-phase detector, numeral 31 denotes a PLL (phase locked loop) oscillator, numeral 32 denotes a sinusoidal wave generator, numeral 33 denotes a voltage controller, numeral 35 denotes a sinusoidal wave controller, and numerals 34 and 36 denote comparators.

The voltage signal synchronized with the power source voltage by transformer 29 is applied to the zero-phase detector 30, which detects the zero point of the signal which is then divided into three phases by the PLL oscillator 31 with the zero point as a basic point, and applied to the sinusoidal wave generator 32. The sinusoidal wave outputted from the sinusoidal wave generator 32 is applied to the voltage controller 33.

The voltage command value from the voltage instruction unit 28 is compared by comparator 36 with the voltage across the capacitor 6, and its deviation is applied to the voltage controller 33. The voltage controller 33 takes the sinusoidal wave applied from the sinusoidal wave generator 32 and the voltage deviation from the comparator 36 and creates a sinusoidal wave current command to the comparator 34. The comparator 34 compares the current command with the actual current from the current transformer 23 and applies its deviation to the sinusoidal wave controller 35. The sinusoidal wave controller 35 PWM-controls transistors 26a to 26f of the converter 25 according to this deviation. Therefore, the output current of the converter 25 becomes a sinusoidal wave to prevent harmonic waves from being generated and then is smoothed by capacitor 6.

Since the control of the transistor inverter 7 is the same as that in the control in FIG. 1, the description will be omitted.

In the control system for the induction motor in FIG. 3, the PAM control can be performed only by reducing the voltage command outputted from the voltage instruction unit 28, and, further, the noise reduction of the resulting therefrom cannot be measured.

More specifically, when the d.c. output voltage is reduced by a certain degree, the diodes 26g to 26l connected in parallel with the transistors 26a to 26f of the converter 26 conduct so that the transistors 26a to 26f lose their controlling capacity. Thus, the d.c. voltage is reduced to the voltage or lower determined by the 3-phase diode bridge control type. Therefore, in order to achieve the PAM control, it is necessary to reduce the input voltage of the converter 26 by some method. In other words, to obtain a full range of speed control, from stop to full speed, it is necessary to vary the variable voltage output of the inverter 7 from low to full voltage so as to reduce motor noise at higher speeds.

This invention has been made to solve this problem, and provides a control system for an induction motor which reduces noise by adding PWM control to a sinusoidal wave input converter. The feature of the control system for the induction motor is to provide power factor control means for varying the power factor of the input current of a converter to alter the d.c. output voltage of the converter in PWM control means of a VVVF controller using a sinusoidal wave input converter composed of self-arc extinguishing elements, such as transistors, to perform the PAM control. More specifically, the power factor of the input current of the transistor converter for converting an a.c. voltage to a d.c. voltage is set to to reduce the input voltage of the converter, thereby achieving the PAM control.

Figure 5:
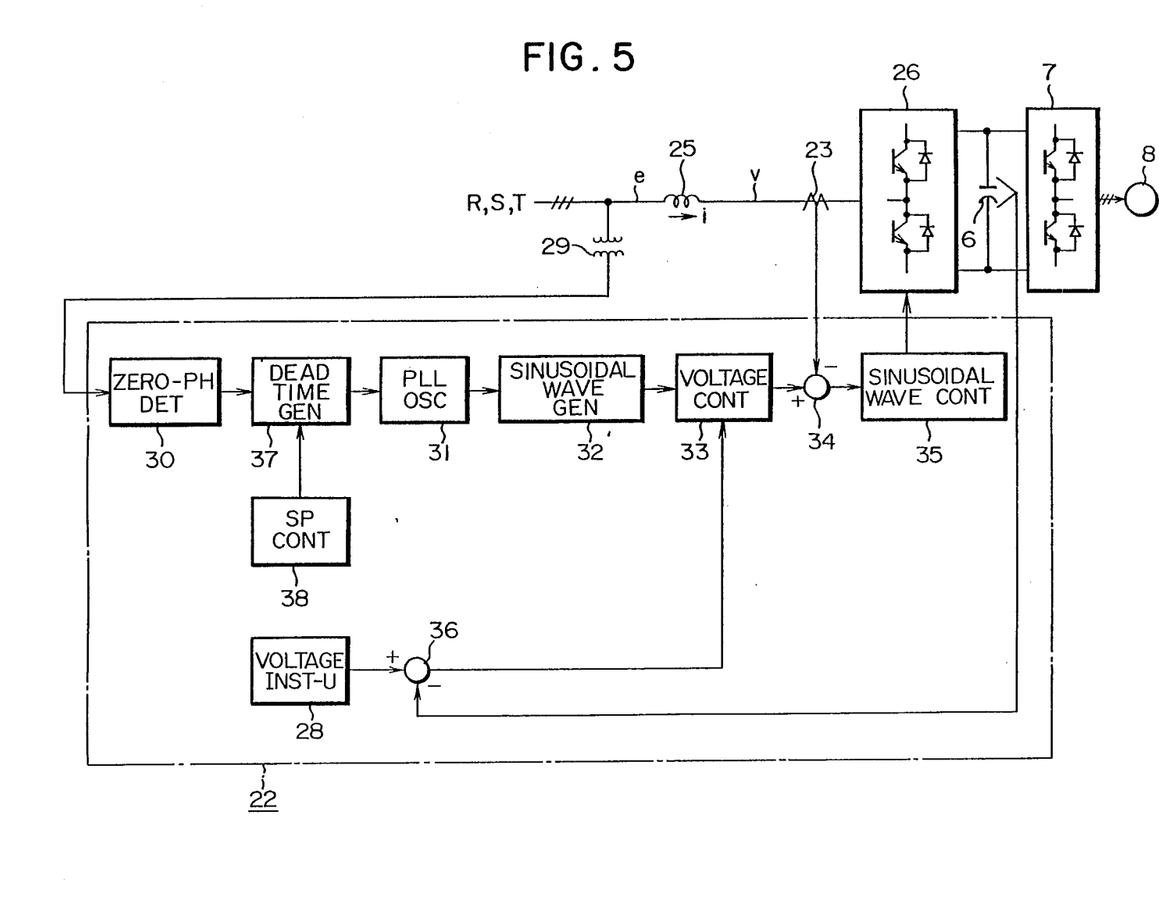
FIG. 5 is a block diagram of the control system according to the present invention.

FIG. 5 is a block diagram showing a control system of the invention, which is similar to the control system in FIG. 3, wherein the same symbols as those in FIGS. 3 and 4 indicate the same or corresponding parts. In the drawings, reference numeral 37 is a dead time generator provided between a zero-phase detector 30 and a PLL oscillator 31, and numeral 38 denotes a speed instruction unit for feeding a speed command value to the dead time generator 37.

The operation of the control system for the induction motor constructed as described above will be described. The principle of the control system will be first described.

Figure 6A:
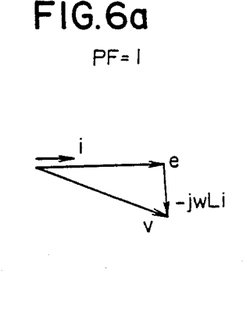
FIGS. 6(a), 6(b) and 6(c) are vector diagrams showing the principle of a control system for an induction motor according to the present invention.
Figure 6B:
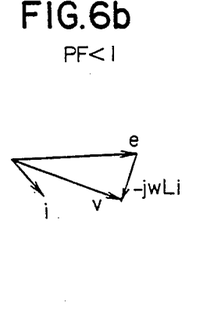
Figure 6C:
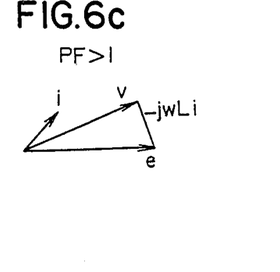

As shown in FIG. 5, the input terminal voltage v of the converter 26 is represented by the following equation:

$$v = e - j\omega Li \qquad (1)$$

where e is the voltage of the power source, i is the input current of the converter 26 having the transistors and the diodes, v is the input terminal voltage of the converter 26, and L is the inductance of the a.c. reactor 25. Further, the power factor is defined as the ratio between reactive and real power:

$$\text{Power Factor} = \tan \phi \qquad (2)$$

where $\phi$ is the phase angle of reactive current i and supplied voltage e. The input terminal voltage v of the converter 26 is represented by a vector as shown in FIG. 6. FIG. 6(a) shows the case that the voltage e of the power source coincides in phase with the input current i of the converter 26, i.e., the power factor = 1. FIG. 6(b) shows the case that the phase of the input current i lags from the phase of the voltage e of the power source, i.e., the power factor is less than 1. FIG. 6(c) shows the case that the phase of the input current i is led from the phase of the voltage e of the power source, i.e., the power factor is larger than 1. As shown in FIG. 6, the input terminal v of the converter 26 can be reduced by employing the lagging power factor or the leading power factor to produce a non-unity power factor, i.e., a power factor other than 1. Therefore, the converter 26 can be PAM-controlled.

Figure 7A:
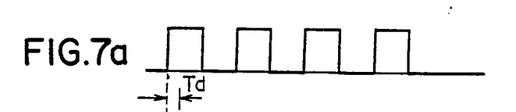
FIGS. 7a and 7b are waveform diagrams of the outputs of a zero-phase detector and a dead time generator in FIG. 5.
Figure 7B:
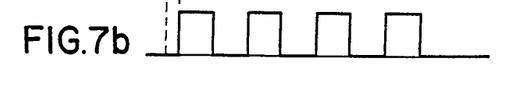

As shown in FIG. 5, the dead time generator 37 is provided between the zero-phase detector 30 and the PLL oscillator 31. A zero-point signal for detecting the zero-point of the voltage signal synchronized with the voltage of the power source fed from transformer 29 is applied from the zero-phase detector 30 to the dead time generator 37 as shown in FIG. 7(a). The speed command value of the induction motor 8 is applied from the speed instruction unit 38 to the dead time generator 38 to lag the phase of the zero-point signal fed from the zero-phase detector 30 by a dead time Td responsive to the speed command value as shown in FIG. 7(b). A delay in time Td in the time domain is equivalent to a phase shift in the frequency domain. FIG. 8 shows the relationship between the speed command value inputted to the dead time generator 37 and the dead time Td.

Figure 8A:
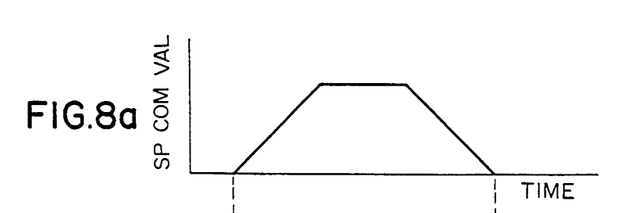
FIGS. 8a and 8b are graphs showing the relationship between a speed command value and a dead time Td in FIG. 5.
Figure 8B:
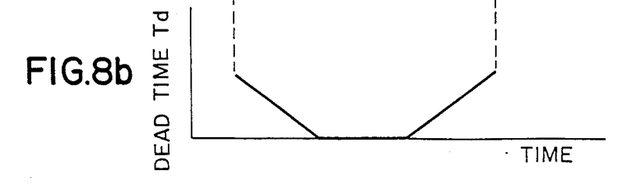

FIG. 8(a) shows the command value which varies as the time goes, and FIG. 8(b) shows the dead time Td which varies in response to the speed command value. As shown in FIG. 8, when the speed command value is low, the dead time Td is large, while as the speed command value increases, the dead time Td becomes small.

The zero-point signal lagging in phase by the dead time Td is applied to the PLL oscillator 31, then decomposed to three phases by the PLL oscillator 31 with the zero-point signal as a reference, and is applied to the sinusoidal wave generator 32 which outputs the sinusoidal wave. The sinusoidal wave is compared with the voltage deviation fed from the comparator 36 to the voltage controller 33 to become the current command. This is compared with the actual current sensed by the current transformer 23 in the comparator 34, and the deviation is applied to the sinusoidal wave controller 35. In other words, when the zero-point detected by the zero-phase detector 30 is lagged by the dead time Td, the phase of the current command can be lagged by a dead time Td from the phase of the voltage e of the power source. Therefore, the input voltage v of the converter 26 can be reduced to perform the PAM control.

In the embodiment described above, the lagging power factor has been described. However, the same operation can be also performed in a leading power factor within the scope of the invention.

According to the present invention as described above, the power factor of the input current of the converter composed of self-arc extinguishing elements, such as transistors, is led or lagged by PWM control means of the VVVF controller for controlling the rotating speed of the induction meter to reduce the input voltage of the converter, thereby performing a PAM control. Therefore, the invention can prevent harmonic waves from being generated by the VVVF controller with a simple construction, and thus can reduce the noise resulting from the operation of the induction motor.

What is claimed is:

1. A control system for an induction motor comprising a VVVF controller supplied with a.c. current input voltage and current and having a converter and an inverter composed of self-arc extinguishing elements to supply a variable voltage, variable frequency a.c. voltage to the induction motor which controls speed of the induction motor;

control means for controlling elements of said converter by using a pulse-width modulation (PWM) of gating signals to gate input current through said elements to produce a rectified sinusoidal current having a given phase relationship with the input voltage; and dead time generating means provided in said control means for introducing a phase shift to produce a phase difference between the output current and the input voltage to said converter by varing the width of the PWM gating signals in accordance with speed command values to produce a non-unity power factor whereby current to the induction motor is controlled to vary motor speed over a wide range from stop to full speed without requiring full voltage output from said inverter, thereby minimizing motor noise.

2. A control system for an induction motor according to claim 1 wherein said control means includes a means receiving an input voltage signal and which detects zero-phase of the voltage signal and produces an output, and said dead time generator means controls phase of said output current by transferring the voltage signal after a set time determined by the speed command values upon reception of the output of said zero-phase detector means, and said control means includes a voltage controller which converts the voltage signal to a control signal according to an output of said converter and the phase of the voltage signal.

* * * * *